(12) United States Patent
Carelli et al.

(10) Patent No.: US 9,556,702 B2
(45) Date of Patent: *Jan. 31, 2017

(54) COMPOSITIONS AND METHODS FOR WELL COMPLETIONS

(71) Applicant: Schlumberger Technology Corporation, Sugar Land, TX (US)

(72) Inventors: Clara Carelli, Cambridge (GB); Sylvaine Le Roy-Delage, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/350,077

(22) PCT Filed: Dec. 18, 2012

(86) PCT No.: PCT/EP2012/075981
§ 371 (c)(1),
(2) Date: Apr. 7, 2014

(87) PCT Pub. No.: WO2013/092604
PCT Pub. Date: Jun. 27, 2013

(65) Prior Publication Data
US 2014/0318776 A1  Oct. 30, 2014

(30) Foreign Application Priority Data

Dec. 23, 2011 (EP) .................................. 11306774.8

(51) Int. Cl.
| | | |
|---|---|---|
| C04B 24/26 | (2006.01) |
| E21B 33/13 | (2006.01) |
| C04B 28/02 | (2006.01) |
| C09K 8/42 | (2006.01) |
| C09K 8/467 | (2006.01) |
| C04B 28/04 | (2006.01) |
| C04B 28/06 | (2006.01) |
| C04B 28/32 | (2006.01) |
| C04B 28/34 | (2006.01) |
| C04B 103/00 | (2006.01) |

(52) U.S. Cl.
CPC ............ *E21B 33/13* (2013.01); *C04B 24/2652* (2013.01); *C04B 28/02* (2013.01); *C04B 28/04* (2013.01); *C04B 28/06* (2013.01); *C04B 28/32* (2013.01); *C04B 28/34* (2013.01); *C09K 8/426* (2013.01); *C09K 8/428* (2013.01); *C09K 8/467* (2013.01); *C04B 2103/0049* (2013.01); *Y02W 30/92* (2015.05); *Y02W 30/94* (2015.05)

(58) Field of Classification Search
None
See application file for complete search history.

(56) References Cited

U.S. PATENT DOCUMENTS

| | | | |
|---|---|---|---|
| 4,892,916 A | 1/1990 | Hawe et al. | |
| 5,465,792 A | 11/1995 | Dawson et al. | |
| 5,686,555 A | 11/1997 | Dahmen et al. | |
| 8,668,010 B2 * | 3/2014 | Joseph et al. .................. | 166/282 |

FOREIGN PATENT DOCUMENTS

| | | |
|---|---|---|
| EP | 2025732 | 2/2009 |
| JP | 3050209 | 3/1991 |
| WO | 2011/131306 | 10/2011 |

OTHER PUBLICATIONS

Office Action issued in related EP application 11306774.8 on Sep. 30, 2015, 8 pages.

* cited by examiner

*Primary Examiner* — Angela M DiTrani
(74) *Attorney, Agent, or Firm* — Andrea E. Tran

(57) ABSTRACT

A remedial method for repairing a damaged cement sheath, especially for use in wells in which fluids with a pH lower than 6 are injected, stored or extracted, comprises placing an acid swellable composition adjacent to the cement sheath. In the event of cement-matrix failure, or bonding failure between the cement/casing interface or the cement/borehole-wall interface, the composition may be injected into or adjacent to the cement sheath so that the material swells when contacted by acid gases, including carbon dioxide and hydrogen sulfide. The swelling seals voids in the cement matrix, or along the bonding interfaces, thereby restoring zonal isolation.

13 Claims, No Drawings

COMPOSITIONS AND METHODS FOR WELL COMPLETIONS

BACKGROUND

The statements in this section merely provide background information related to the present disclosure and may not constitute prior art.

This disclosure relates to compositions and methods for treating subterranean formations, in particular, compositions and methods for cementing and completing wells in which acid gases reside, are injected, stored or recovered.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone.

The cement sheath achieves hydraulic isolation because of its low permeability. In addition, intimate bonding between the cement sheath and both the tubular body and borehole is necessary to prevent leaks. However, over time the cement sheath can deteriorate and become permeable. Alternatively, the bonding between the cement sheath and the tubular body or borehole may become compromised. The principal causes of deterioration and debonding include physical stresses associated with tectonic movements, temperature changes, pressure changes inside the casing and chemical deterioration of the cement.

There have been several proposals to deal with the problems of cement-sheath deterioration. One approach is to design the cement sheath to mechanically survive physical stresses that may be encountered during its lifetime. Another approach is to employ additives that improve the physical properties of the set cement. Amorphous metal fibers may be added to improve the strength and impact resistance. Flexible materials (rubber or polymers) may be added to confer a degree of flexibility to the cement sheath. Or, cement compositions may be formulated to be less sensitive to temperature fluctuations during the setting process.

A number of proposals have been made concerning "self-healing" concretes in the construction industry. The concept involves the release of chemicals inside the set-concrete matrix. The release is triggered by matrix disruption arising from mechanical or chemical stresses. The chemicals are designed to restore and maintain the concrete-matrix integrity. None of these concepts are immediately applicable to well-cementing operations because of the need for the cement slurry to be pumpable during placement, and because of the temperature and pressure conditions associated with subterranean wells.

More recently, self-healing cement systems have been developed that are tailored to the mixing, pumping and curing conditions associated with cementing subterranean wells. One approach is to add superabsorbent polymers that may be encapsulated. If the permeability of the cement matrix rises, or the bonding between the cement sheath and the tubular body or borehole wall is disrupted, the superabsorbent polymer becomes exposed to formation fluids. Most formation fluids contain some water, and the polymer swells upon water contact. The swelling fills voids in the cement sheath, restoring the low cement-matrix permeability. Likewise, should the cement/tubular body or cement/borehole wall bonds become disrupted, the polymer will swell and restore isolation. Another approach involves the addition of rubber particles that swell when exposed to hydrocarbons. Like the superabsorbent polymers, the swelling of the rubber particles restores and maintains zonal isolation.

Some oil and gas fields have formations whose fluids contain acid gases such as carbon dioxide and hydrogen sulfide. Such wells may be challenging from a zonal isolation point of view. Carbon dioxide injection is a well-known enhanced oil recovery (EOR) technique. In addition, there are some oil and gas wells whose reservoirs naturally contain carbon dioxide.

A relatively new category of wells involving carbon dioxide is associated with carbon-sequestration projects. Carbon sequestration is a geo-engineering technique for the long-term storage of carbon dioxide or other forms of carbon, for various purposes such as the mitigation of climate change. Carbon dioxide may be captured as a pure byproduct in processes related to petroleum refining or from the flue gases from power plants that employ fossil fuels. The gas is then usually injected into subsurface saline aquifers or depleted oil and gas reservoirs. One of the challenges is to trap the carbon dioxide and prevent leakage back to the surface; maintaining a competent and impermeable cement sheath is a critical requirement.

Oil and gas that contains elevated amounts of hydrogen sulfide are called "sour." It has been estimated that 15 to 25% of natural gas in the United States may contain hydrogen sulfide. Worldwide, the percentage could be as high as 30%. Hydrogen sulfide is a toxic substance; therefore, it is important to prevent it from escaping through the cement sheath into aquifers or to the surface. Furthermore, hydrogen sulfide is corrosive to steel, and maintaining a competent cement sheath is essential to prevent casing deterioration during the life of the well.

SUMMARY

The previously disclosed self-healing cement systems are concerned with traditional wells and swell when contacted by water and/or hydrocarbons; none of these aims at behavior of the cement sheath when contacted by carbon dioxide or hydrogen sulfide. The Applicant discloses herein cements that have self-healing properties in the presence of these acid gases and especially methods to repair such cement once damaged.

In an aspect, embodiments relate to methods for restoring zonal isolation in a subterranean well having a damaged cement sheath in which fluids with a pH lower than about 6 reside or are injected, stored or extracted. The damaged cement sheath may have voids, cracks or fissures that allow wellbore fluids to migrate to other subterranean zones or to the surface. The damage may also be manifested as a microannulus between the cement sheath and a casing wall, between the cement sheath and the borehole wall, or both. An aqueous composition comprising an amine polyacrylate copolymer is provided. The composition is placed into or adjacent to the cement sheath. The cement sheath is exposed to wellbore fluids having a pH lower than about 6. The composition is allowed to swell, thereby repairing the damaged cement sheath and restoring zonal isolation.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As stated earlier, self-healing cement systems that operate in an environment containing acid gases would be an improvement in the industry. In a manner analogous to the self-healing mechanisms described earlier, such cement systems would contain materials that swell in the presence of low-pH fluids. And, the amount of swelling would be sufficient to close voids that may appear in the cement sheath. The inventors have determined that cement slurries containing an acid swelling material have self-healing properties when exposed to acid gases. Then, they have further determined that a remedial operation might be achieved on classical cement sheath or even on the self-healing cement sheath as mentioned above.

For such remedial operations, aqueous compositions are provided comprising a material that swells when contacted by a fluid having a pH lower than about 6. The composition is placed into or adjacent to the cement sheath, which is exposed to wellbore fluids having a pH lower than about 6. The material in the composition is then allowed to swell and restore zonal isolation. The fluid may comprise carbon dioxide, hydrogen sulfide or a combination thereof.

The material may comprise an acid-swellable polymer, which may be an acid-swelling latex. The material may comprise an amine polyacrylate copolymer, whose active concentration in the composition may be between about 1% and 95% by weight, and may be between about 50% and 95% by weight. The wellbore fluid may comprise carbon dioxide, hydrogen sulfide or a combination thereof.

Those skilled in the art will recognize that the aqueous composition may comprise a cement slurry, or it may comprise an aqueous suspension of acid-swelling materials without cement. The composition may be placed during remedial operations, including squeeze treatments and via a wireline tool.

Alternatively, aqueous cement slurries may comprise a material that swells when contacted by a fluid having a pH lower than about 6. The composition is placed into or adjacent to the cement sheath, which is exposed to wellbore fluids having a pH lower than about 6. The material in the composition is then allowed to swell and restore zonal isolation. The fluid may comprise carbon dioxide, hydrogen sulfide or a combination thereof. The cement slurry may comprise Portland cement, calcium aluminate cement, fly ash, blast furnace slag, lime-silica blends, geopolymers, zeolites, Sorel cements, or chemically bonded phosphate ceramics, or combinations thereof. The cement slurry may comprise Portland cement.

The composition may further comprise additives including dispersing agents, fluid-loss-control agents, retarders, accelerators, gas-generating agents, antifoam agents and combinations thereof.

The composition may be pumpable. Those skilled in the art will recognize that a pumpable fluid in the context of well cementing has a viscosity lower than about 1000 mPa-s at a shear rate of 100 $s^{-1}$ at the temperatures to which the fluid is exposed during a cementing operation, and during the time necessary to place the composition in the well.

In an aspect, embodiments relate to methods for restoring zonal isolation in a subterranean well having a borehole, in which fluids with a pH lower than about 6 reside or are injected, stored or extracted. An aqueous slurry comprising a material that swells when contacted by a fluid having a pH lower than about 6 is injected into or adjacent to the cement sheath that has integrity deficiency such as cracks and/or microannulus. Indeed, in the event of cement-matrix or bonding failure, the set cement may become exposed to at least one fluid having a pH lower than about 6. The acid-swelling material therein is allowed to swell, thereby sealing cracks, voids and fissures within the cement matrix, or microannuli between the cement sheath and the casing, the cement sheath and the borehole wall (or previously installed casing), or both. Such swelling may restore zonal isolation in the well.

The material may comprise an acid-swellable polymer, which may be an acid-swelling latex. The material may comprises an amine polyacrylate copolymer, whose active concentration in the cement matrix may be between about 1% and 40% by volume of solids in the cement slurry, and may be between about 5% and 20% by volume of solids in the cement slurry. The fluid may comprise carbon dioxide, hydrogen sulfide or a combination thereof.

The aqueous slurry may comprise Portland cement, calcium aluminate cement, fly ash, blast furnace slag, lime-silica blends, geopolymers, zeolites, Sorel cements, or chemically bonded phosphate ceramics, or combinations thereof. The cement slurry may comprise Portland cement. The cement slurry may further comprise dispersing agents, fluid-loss-control agents, set retarders, set accelerators, gas-generating agents and antifoaming agents.

Remedial cementing operations may include the setting of cement plugs and squeeze-cementing operations to restore zonal isolation or seal perforations. The slurry may be pumped through tubular bodies such as drillpipe or coiled tubing, or placed by the dump bailer technique.

Those skilled in the art will recognize that the disclosed methods pertain not only to wells where fluids are injected, stored or extracted, but also to monitoring wells that, for example, provide long-term surveillance of the behavior of a subterranean formation or to geothermal wells.

The invention claimed is:

1. A method for restoring zonal isolation in a subterranean well having a damaged cement sheath, and in which carbon dioxide, hydrogen sulfide or both reside or are injected, stored or extracted, comprising:
   (i) providing an aqueous composition comprising an amine polyacrylate copolymer;
   (ii) placing the composition into or adjacent to the damaged cement sheath;
   (iii) exposing the cement sheath to the carbon dioxide, hydrogen sulfide or both, thereby causing the amine polyacrylate copolymer to swell in or adjacent to the damaged cement sheath and repair the damaged cement sheath and restore zonal isolation.

2. The method of claim 1, wherein the copolymer is in the form of an acid swellable latex.

3. The method of claim 1, wherein the copolymer concentration in the composition is between 1 percent and 95 percent by weight of the composition.

4. The method of claim 3, wherein the copolymer concentration in the composition is between 50 percent and 95 percent by weight of the composition.

5. The method of claim 1, wherein the cement sheath comprises portland cement, calcium aluminate cement, fly ash, blast furnace slag, lime-silica blends, geopolymers, zeolites, Sorel cements or chemically bonded phosphate ceramics or combinations thereof.

6. The method of claim 1, wherein the composition further comprises portland cement, fly ash, blast furnace slag, lime-silica blends, geopolymers, zeolites, Sorel cements or chemically bonded phosphate ceramics or combinations thereof.

7. The method of any one of claim 6, wherein the composition further comprises dispersing agents, fluid-loss control agents, retarders, accelerators, gas-generating agents, antifoam agents and combinations thereof.

8. The method of claim 6, wherein the composition is placed during a remedial cementing operation.

9. The method of claim 6, wherein the copolymer concentration is between 1 percent and 40 percent by volume of solids.

10. The method of claim 1, wherein the composition has a viscosity lower than 1000 mPa-s at a shear rate of $100\ s^{-1}$.

11. The method of claim 1, wherein the composition is placed by being pumped through drillpipe, through coiled tubing or by the dump-bailer technique.

12. The method of claim 1, wherein the well is a monitoring well.

13. The method of claim 1, wherein the well is a geothermal well.

* * * * *